Dec. 2, 1958　　A. SILVERSTEIN ET AL　　2,862,367
PRECAST CABLE TRENCH
Filed Sept. 27, 1956
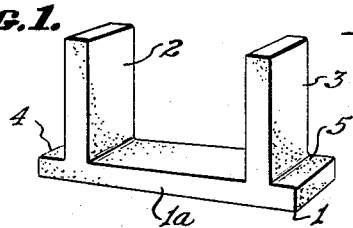
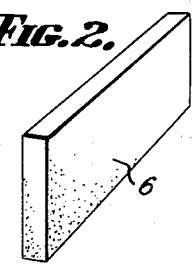
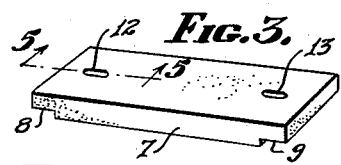
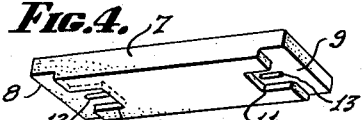
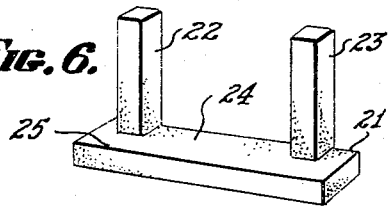
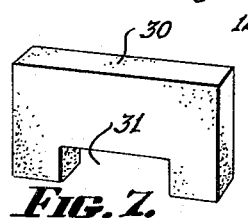
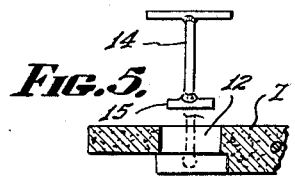
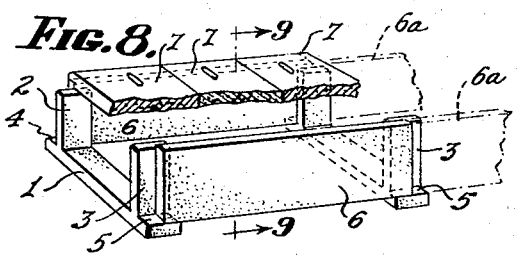
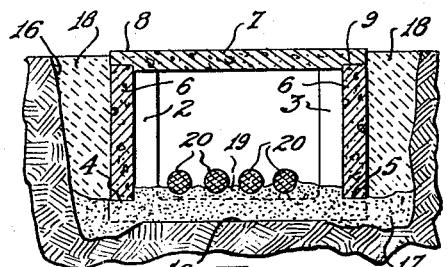
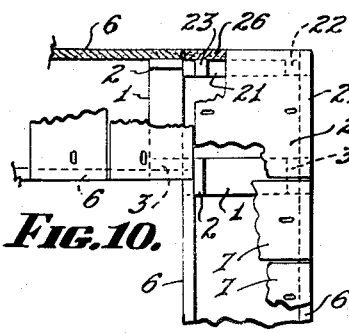
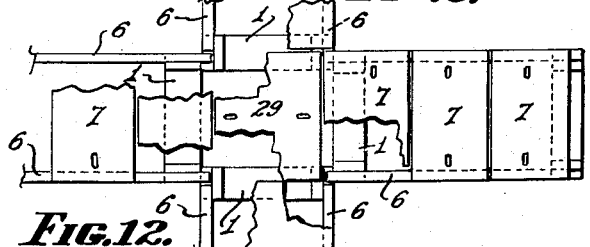
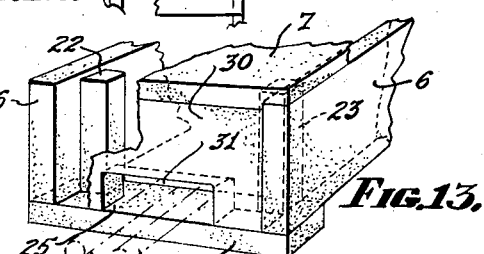
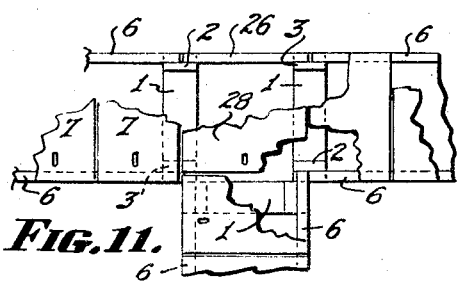
INVENTORS.
ABE SILVERSTEIN,
CLIFFORD H. MOHS
BY AND KEITH C. ANDRUS,
ATTORNEYS.

United States Patent Office 2,862,367
Patented Dec. 2, 1958

2,862,367

PRECAST CABLE TRENCH

Abe Silverstein and Clifford H. Mohs, Cincinnati, Ohio, and Keith C. Andrus, Ludlow, Ky.

Application September 27, 1956, Serial No. 612,538

3 Claims. (Cl. 61—41)

Our invention relates to cable trenches, and more particularly to a prefabricated trench system for accommodating service cables, pipe lines and the like which are normally laid in a trench.

While our invention was initially conceived for use in power stations, substations and the like, to house electrical cables, it will be apparent that its utility is not so limited and the invention may be employed for any installation wherein a trench is required. We shall, however describe our invention as it applies to the laying of cables at a substation or a power station.

The present, generally accepted method of laying cables involves the digging of an open trench 21–24 inches deep and 18–24 inches wide. A layer of sand is then placed in the bottom of the trench, whereupon the cables are placed in the trench and supported on the sand. Additional sand is then put in the trench to cover the cables and the sand in turn covered by creosote soaked wooden planks positioned to lie several inches below the ground level. The remainder of the trench above the planks is then filled with dirt. Where additional cables are to be laid in the trench or where repairs are required to the cables already laid, it will be evident that the workmen must dig up the trench and this, of course, is a time consuming and difficult job.

In contrast to the practice characterized above, our invention contemplates the provision of precast trench forming sections which may be readily assembled in any required length or shape, the sections being provided with easily removable covers which lie at the ground level, thereby providing ready access to the cables simply by removing the cover members.

It is thus a principal object of our invention to provide a precast trench structure formed from prefabricated sections which may be quickly and easily assembled at their place of use.

A further object of our invention is the provision of trench forming sections consisting essentially of supporting brackets, side walls, top slabs and bulkhead walls, all of which are of a size to be easily handled and readily fitted together in the field.

A further object of our invention is the provision of trench forming sections which may be assembled together to form trench structures in which the sections are joined together at angles to one another, the same basic components enabling the user to provide elbow joints, T-joints, intersections and the like.

Still a further object of our invention is the provision of a trench structure in which the component parts thereof are readily fitted together and yet do not require permanent attachment one to the other, thereby permitting the structures to be disassembled and reused in a new location if so desired.

Still a further object of our invention is the provision of a trench forming structure of the character described wherein the covers or top members of the structure are readily removable and provided with convenient means for engaging and removing them.

The foregoing, together with other objects of our invention which will appear hereinafter or which will be apparent to the skilled worker in the art upon reading these specifications, we accomplish by that construction and arrangement of parts of which we shall now describe an exemplary embodiment.

Referring now to the figures of the drawing wherein:

Figure 1 is a perspective view of a bracket member in accordance with our invention.

Figure 2 is a perspective view of a side wall member in accordance with our invention.

Figure 3 is a perspective view of a top slab in accordance with our invention.

Figure 4 is a perspective view of a top slab viewed from beneath.

Figure 5 is a sectional view taken along the line 5—5 of Figure 3 and also illustrating slab engaging and lifting means.

Figure 6 is a perspective view of a modified form of bracket member.

Figure 7 is a perspective view of a bulkhead wall in accordance with our invention.

Figure 8 is a perspective view with parts broken away illustrating a trench section formed in accordance with our invention.

Figure 9 is a vertical sectional view taken along the line 9—9 of Figure 8 and illustrating the field assembly of the sections.

Figure 10 is a fragmentary plan view with parts broken away illustrating an elbow joint construction.

Figure 11 is a plan view with parts broken away illustrating a T-joint construction.

Figure 12 is a plan view with parts broken away illustrating an intersection formed in accordance with our invention.

Figure 13 is a fragmentary perspective view with parts broken away illustrating the use of a bulkhead wall at the end of a trench section.

Referring first to Figure 1 of the drawings, we have therein illustrated a bracket member 1 which forms the basic supporting element for our trench structure. The bracket member comprises a base 1a having upstanding posts 2 and 3 spaced inwardly from the end edges of the base to provide supporting ledges 4 and 5. The ledges 4 and 5 will have a width substantially equal to the width of the side wall panels adapted to be supported thereon, such side wall panel being illustrated at 6 in Figure 2. It will be understood, of course, that a separate side wall panel will be provided to form each side of the section. A top slab 7 is illustrated in Figure 3, the top slab being of a size to extend crosswise of the trench structure with its recessed shoulders 8 and 9 resting on the upper edges of the side wall slabs 6. Preferably, the under surface of the top slab will be cut away in the areas 10 and 11, with the elongated slots 12 and 13 extending through the slab and opening into the cut away areas.

The slots 12 and 13 provide a convenient means by which a key or tool 14 having an elongated head 15 may be passed through the slots and turned so as to permit the head 15 to engage the under surface of the slab in the cut away areas, thereby permitting the slab to be readily lifted and handled.

The parts just described, which comprise the basic components of our trench sections, will be formed from reinforced precast concrete, preferably being formed from those types of concrete known to the trade as "lightweight" concrete. The various members will be suitably reinforced with the formed rod or bar stock to meet the requirements of use. In an exemplary embodiment, we have found that precast members formed from concrete weighing 98 pounds per cubic foot and suitably reinforced to provide a compressive strength of 3,000 pounds per square inch provide a highly satisfactory structure. Similarly, while the dimensioning of the parts is not critical, we have found that brackets, wall panels and top slabs having a thickness of approximately 3 inches are highly satisfactory. The overall dimensions will, of course, vary depending upon the size of trench structure desired, although it will be apparent that the side wall members may be formed in various standardized lengths to fit the normal conditions of use. Thus, in a typical assembly, the lengths of the side walls may be standardized at 60 inches, 40 inches and 20 inches, with corner and joint forming walls of 32 inch lengths. Similarly, the top slabs may be standardized at 20 inch lengths, with 26 inch and 29 inch lengths for corner section joints and the like. These exemplary dimensions have been utilized with bracket members having an all over length of 2 feet 8 inches and an all over height of 18 and ¼ inches.

An assembled trench section is illustrated in Figure 8. As seen therein, the section comprises a pair of bracket members at each end thereof, the bracket members supporting side wall panels 6 which rests on the supporting ledges 4 and 5 of the brackets with end edges of the side wall panels terminating intermediate the width of the base members 1. Thus the end of an adjacent wall panel 6a (shown in dotted lines) may be brought into edge abutting relationship to the wall panel 6 and the abutting ends of the panels 6 and 6a supported by a single bracket member. The top slabs 7 are then fitted in place crosswise of the section, in the manner illustrated.

Figure 9 illustrates the manner in which the sections are installed in the field. As seen therein, the base 1a of the bracket member is first seated in the bottom of an open ditch or trench 16 in the bottom of which sand or other fill 17 has been placed to level the bracket members. The side panels 6 are then fitted in place on the ledges 4 and 5 with the inner surfaces of the side walls juxtaposed to the posts 2 and 3. The side walls are then held in place by means of an after fill 18 which holds the side wall panels against the brackets and eliminates the necessity for interengaging means or the like to hold the parts in assembly. Additional sand 19 may then be placed within the side walls of the trench structure to form a floor, the sand covering the base portions of the bracket member. The service cables or the like 20 are then laid on the sand in the manner illustrated; and the structure is completed by placing the top slabs crosswise of the trench, the recessed shoulders 8 and 9 of the top slabs seating on the upper edges of the side wall panels 6. To this end, it will be noted that the upper edges of the side wall panels project upwardly beyond the upper edges of the posts 2 and 3 by a distance equal to the depth of the recessed shoulders 8 and 9. It will be understood, of course, that in positioning the bracket members, their depth below the ground level will be such that the upper surfaces of the top slabs lie at or slightly above the ground level.

It will be readily apparent from the above that the trench may be easily opened by simply inserting the tool 14 in the slots of the top slabs, whereupon the top slabs may be removed to expose the service cables for repair or replacement. In addition, the top slabs when in place will serve as a convenient cement walk following the path of the various cables.

In order to obtain complete flexibility of the sections for forming elbow joints and the like, we have found it desirable to provide a second form of bracket member 21 which, as seen in Figure 6, is provided with supporting posts 22 and 23 which extend inwardly from one side edge of the base member 24 but terminating short of the opposite side edge of the base so as to provide a longitudinal supporting ledge 25. Thus, as seen in Figure 10, an elbow joint may be constructed by placing a pair of the brackets 1 at right angles to each other to form the ends of the straight trench sections, the joint corner of the trench being formed by means of a bracket member 21 which will support a short wall section 26 on its longitudinal edge 24, a second short wall section 27 forming the adjaient side of the corner joint. A special square cover slab 28 is provided to close the top of the joint.

Figure 11 illustrates the formation of a T-joint. As illustrated therein, three of the brackets 1 are arranged to form the ends of the three meeting sections, and a short wall section 26 is utilized to close the fourth side of the T-joint. A suitably dimensioned cover slab 28 furnishes the top for the joint.

Figure 12 illustrates the formation of an intersection or cross, the construction being substantially identical with that of Figure 11 excepting in the use of a fourth bracket member 1 to complete the intersection. In this instance the intersection is covered by means of a top slab 29 similar to the cover member 28.

Figure 13 illustrates how a trench section may be terminated in an end wall. To this end, a bracket member 21 is provided at the end of the section with the longitudinal supporting ledge 25 outermost. A bulkhead or end wall 30 (Figure 7) which may have an opening 31 therein is supported on the longitudinal ledge 25 and serves to close the end of the trench. The opening 31 permits cables such as the cables 20a illustrated in dotted lines to project therethrough, as where it is desired to extend one or more of the cables beyond the confines of the trench. Of course, if desired, the end of the trench may be closed by a solid bulkhead wall.

From the foregoing it should be apparent that our trench structure provides a convenient, inexpensive and easy to handle unit which may be readily assembled and disassembled and which does not require the permanent joining together of the parts. Modifications may be made in our invention without departing from the spirit of it and we do not intended to limit ourselves excepting in the manner set forth in the claims which follow.

Having thus described our invention in an exemplary embodiment, what we desire to secure and protect by Letters Patent is:

1. A precast cable trench structure comprising, in combination, a series of brackets arranged crosswise in spaced apart generally parallel relation in an open trench, each of said brackets having a horizontally disposed base and a pair of vertical posts extending upwardly from the base, said posts being of a height sufficient to support side wall slabs in vertical position and spaced inwardly from the end edges of the base to define outwardly extending slabs supporting ledges at the ends of the brackets, the bases of the said brackets being of a width sufficient to be self supporting, generally rectangular wall forming slabs extending between the approximate mid points of corresponding ledges of adjacent barckets, said slabs having the end portions of their bottom edges supported on said ledges and their inner surfaces contacting and supported by the outermost surfaces of said vertical posts, and cover members extending crosswise of the trench between opposed wall slabs, said cover members having recessed shoulders at their ends seated upon the upper edges of said slabs, said brackets, wall slabs and cover members being formed of reinforced concrete, whereby to provide a precast cable trench in which the wall slabs and brackets may be retained in assembled relation solely by means of back-fill, and wherein the cover members are readily removable for the laying and replacement of cables therein.

2. The trench structure claimed in claim 1 including end brackets for use at the ends of a length of trench, said end brackets each having a horizontally disposed base and a pair of vertical posts extending upwardly from the base, said posts being of a height sufficient to support side wall slabs in vertical position and spaced inwardly both from the end edges of the base and from one side edge thereof to define outwardly extending slab supporting ledges at the ends of the bracket and a forwardly extending bulkhead supporting ledge along a side of the bracket, said base being of a sufficient width to be self supporting, and a bulkhead wall of a size to extend between said pairs of posts with end portions of the rear surface of the bulkhead contacting and supported by said posts and the lower edge of the bulkhead supported on said forwardly extending ledge.

3. The cable trench structure claimed in claim 2 wherein said wall forming slabs are of uniform height, being slightly higher than said vertical posts, and are provided in a plurality of predetermined lengths, whereby the length of the trench structure may be readily varied to accommodate it to specified lengthwise dimensions.

References Cited in the file of this patent

UNITED STATES PATENTS

| | | |
|---|---|---|
| 714,716 | Lappin | Dec. 2, 1902 |
| 1,036,162 | Stovall | Aug. 20, 1912 |
| 1,080,499 | Stovall | Dec. 2, 1913 |
| 1,168,400 | Kenway | Jan. 18, 1916 |
| 1,227,087 | Steffens | May 22, 1917 |
| 1,694,736 | Fender | Dec. 11, 1928 |
| 1,805,435 | Amsden | May 12, 1931 |
| 1,860,533 | Fredenhagen | May 31, 1932 |
| 1,905,856 | Haase | Apr. 25, 1933 |
| 2,607,211 | Butler | Aug. 19, 1952 |

FOREIGN PATENTS

| | | |
|---|---|---|
| 515,823 | Great Britain | Dec. 14, 1939 |